(12) United States Patent
Margalit et al.

(10) Patent No.: US 10,180,345 B2
(45) Date of Patent: Jan. 15, 2019

(54) WEIGHING AND FEEDING SYSTEM

(71) Applicant: O.E.D.A. LIAD HOLDINGS (2006) LTD., Misgav Industrial Park (IL)

(72) Inventors: Eli Margalit, Moshav Yaad (IL); Dov Bernardo Sosnik, Raanana (IL)

(73) Assignee: O.E.D.A. Liad Holdings (2006) Ltd., Misgav Industrial Park (IL)

( * ) Notice: Subject to any disclaimer, the term of this patent is extended or adjusted under 35 U.S.C. 154(b) by 0 days.

(21) Appl. No.: 15/515,077

(22) PCT Filed: Sep. 8, 2015

(86) PCT No.: PCT/IL2015/050906
§ 371 (c)(1),
(2) Date: Mar. 28, 2017

(87) PCT Pub. No.: WO2016/055994
PCT Pub. Date: Apr. 14, 2016

(65) Prior Publication Data
US 2017/0219414 A1 Aug. 3, 2017

(30) Foreign Application Priority Data

Oct. 6, 2014 (IL) .......................................... 235016

(51) Int. Cl.
*G01G 11/08* (2006.01)
*G01G 13/24* (2006.01)
*G01G 13/02* (2006.01)
(52) U.S. Cl.
CPC ........... *G01G 11/08* (2013.01); *G01G 13/026* (2013.01); *G01G 13/24* (2013.01)

(58) Field of Classification Search
CPC ....... G01G 13/026; G01G 11/08; G01G 13/24
See application file for complete search history.

(56) References Cited

U.S. PATENT DOCUMENTS

| 2,997,158 | A | * | 8/1961 | Moskowitz | ............. B06B 1/045 |
| | | | | | 198/769 |
| 4,683,966 | A | * | 8/1987 | Nakagawa | ............. G01G 13/02 |
| | | | | | 177/25.18 |
| 4,954,975 | A | | 9/1990 | Kalata | |
| 5,074,403 | A | | 12/1991 | Myhre | |
| 5,132,897 | A | * | 7/1992 | Allenberg | ............ G01G 11/086 |
| | | | | | 177/59 |

(Continued)

FOREIGN PATENT DOCUMENTS

IL 230756 7/2015

OTHER PUBLICATIONS

International Search Report for PCT/IL2015/050906, dated Dec. 10, 2015 (4 pages).

(Continued)

*Primary Examiner* — J. Casimer Jacyna
(74) *Attorney, Agent, or Firm* — Roach Brown McCarthy & Gruber, P.C.; Kevin D. McCarthy

(57) ABSTRACT

The invention is a weighing and feeding system for accurate weighing of small quantities of material in pelletized form and feeding the weighed material to processing machines. In particular the invention, is suitable for the preparation of weighed quantities of masterbatch to be added with resin directly into injection molding or extrusion machines for the manufacture of plastic products.

14 Claims, 3 Drawing Sheets

(56) References Cited

U.S. PATENT DOCUMENTS

| | | | | |
|---|---|---|---|---|
| 5,341,307 A * | 8/1994 | Myhre | ............... | G05D 7/0605 |
| | | | | 177/105 |
| 5,767,455 A | 6/1998 | Mosher | | |
| 5,780,780 A * | 7/1998 | Ahmed | ............... | G01G 11/04 |
| | | | | 177/119 |
| 6,007,236 A * | 12/1999 | Maguire | ............... | B01F 3/18 |
| | | | | 177/122 |
| 6,688,493 B2 | 2/2004 | Margalit | | |
| 6,966,456 B2 | 11/2005 | Margalit | | |
| 2004/0099685 A1 * | 5/2004 | Margalit | ............... | B29C 45/18 |
| | | | | 222/1 |
| 2006/0032729 A1 * | 2/2006 | Mosca | ............... | B65G 25/04 |
| | | | | 198/550.4 |

OTHER PUBLICATIONS

Written Opinion of the International Searching Authority for PCT/IL2015/050906, dated Dec. 10, 2015 (6 pages).
Supplementary European Search Report for a counterpart foreign application—EP 15 84 8382—dated May 7, 2018 (10 pages).
Rospen "Loss in weight feeding", Dec. 2, 2002, Retrieved from the internet:URL:http://www.respen.com/downloads/Loss_In_Weight_Feeding.pdf (XP055276380) (6 pages).

* cited by examiner

WEIGHING AND FEEDING SYSTEM

FIELD OF THE INVENTION

The invention is from the field of weighing material for industrial processes. Specifically the invention is from the field of weighing granules of material and feeding them to processing machines.

BACKGROUND OF THE INVENTION

In the modern world plastics are the material of choice for the manufacture of a seemingly unlimited number of products. These products are produced by a variety of industrial processes, e.g. injection molding, blow molding, extrusion, and 3-D printers. The raw material that is fed into the machines used to produce the final products is a mixture consisting mainly of polymers (called resin in the industry) in the form of small beads and relatively very small amounts (by weight) of colorants and other additives, e.g. UV inhibitors. The colorants and other additives are supplied as masterbatches, which are concentrated mixtures of pigments and/or additives encapsulated during a heat process into a carrier resin which is then cooled and cut into a granular shape.

Herein the term masterbatch is used to refer to both color and additive masterbatches. Herein the terms "bead", "pellet", and "granule" are used interchangeably to refer to a small piece of material typically having a weight in the range of 0.01 g-0.04 g.

Many different systems have been described in the prior art for weighing and feeding the pellets of material from a hopper into a process machine. Examples of these systems are described in the following patents to the Applicant of the present invention:

U.S. Pat. No. 6,688,493 teaches a system for feeding portions of material to an injection molding-machine. The system includes a container, a material hopper located inside the container, a load cell coupled to the material hopper, a controller that calculates weight according to the load cell information and commands the motor of the screw feeder to dispense portions of material into the molding-machine.

U.S. Pat. No. 6,966,456 describes a method for using the loss-in-weight method to determine the weight of a portion of material dispensed by the screw in a given time. The method comprises, measuring the initial weight of material in a hopper, dispensing a number of portions—each portion provided by turning the screw at a given speed for a given period of time, measuring the weight of material in the hopper after the number of portions has been dispensed, and dividing the difference between the initial and final weights by the number of portions to the weight of each individual portion. If the weight of the portions varies from a desired value, then the calibration process is repeated by varying the speed of the screw, for example decreasing the rotation speed if the portions are too heavy.

The accuracy of the weight of material fed to a processing machine using a weighing and feed system based on the use of screws or augers decreases dramatically as the weight of material to be added to each batch becomes smaller. When a small weight is needed, e.g. masterbatches, volumetric methods are usually used to achieve the desired weight. Volumetric feeding methods, which are known are however not always reliable because, inter alia, the specific gravity of a masterbatch can change from one supplier to another or between production batches from the same manufacturer. Therefore, frequently a new calibration process, which is time consuming and requires skilled workers, must be carried out for each run to determine the volume of masterbatch that has the required weight.

PCT patent application WO 2015/107517 to the Applicant of the present invention describes a feed system that comprises a feed tube that is capable of feeding very precise amounts of masterbatch to mixers and processing machines.

It is a purpose of the present invention to provide a system that is capable of weighing very light portions of masterbatch and delivering the portions to a processing machine.

Further purposes and advantages of this invention will appear as the description proceeds.

SUMMARY OF THE INVENTION

The invention is a weighing and feeding system for accurate weighing of small quantities of material in pelletized form and feeding the weighed material to processing machines. The system comprises:
  a) a housing comprising:
    i. a hopper adapted to contain the material in pelletized form or a Vacuum loader adapted to dispense the material in pellet form;
    ii) a plate on the top of which are created a tray configured to receive pellets of the material that fall out of the hopper or pellets of the material that are dispensed by the Vacuum loader and the beginning section of an outlet channel leading from the tray to the front wall of the housing;
    iii. a vibration unit located under the plate, the vibration unit configured to cause pellets of the material to move through the outlet channel;
    iv. a weighing platform located under the vibration unit; and
    v. a load cell configured to weigh: the tray and its contents, the beginning section of the outlet channel and its contents, the vibration unit, and the weighing platform and—in the embodiments of the system that comprise a hopper—also the hopper and its contents; and
  b) an extension of the outlet channel, the extension fixedly attached to the outside of the front wall of the tray; and
  c) a controller configured to control the feed rate (weight/time) of material from the system of the invention to a process machine.

In embodiments of the system of the invention the controller controls the feed rate (weight/time) of material from the system by controlling the values of the amplitude and duration of the vibrations provided by the vibration unit and by receiving signals from the load cell and using the loss-in-weight method to calculate the weight of material that has passed through the system in a known period of time.

In embodiments of the system of the invention the controller is adapted to synchronize the rate and timing of feeding of material from the system with the operation of the process machine and other systems that supply different materials to the process machine.

In embodiments of the system of the invention the housing comprises at least one of:
  a) a protective cover surrounding and spaced apart from the hopper, the protective cover fixedly attached to the outside of the top of the housing;
  b) a hollow outlet shaft surrounding the extension of the outlet channel, the hollow outlet shaft fixedly attached to the outside of the front side of the housing; and c) vibration dampers located between the vibration unit and the weighing platform.

In embodiments of the system of the invention the vibration unit is comprised of an electromagnet and an iron block.

In embodiments of the system of the invention the front wall of the tray comprises at least one opening at its bottom through which pellets of material that have fallen into the tray from the hopper or Vacuum loader can pass out of the tray and into the beginning section of the outlet channel.

In embodiments of the system of the invention the controller is adapted to make measurements of the feed rate during production runs, to compare the measured feed rates with the required value and to use these measurements as feedback to correct the rate if necessary. In these embodiments the correction can be applied by changing the amplitude of the vibrations or the system can be calibrated to feed a required quantity in a period of time that is less than a required period of time and the correction is applied by changing the period of time in which the required quantity is fed.

In embodiments of the system of the invention the material in pelletized form is masterbatch and the processing machine is a processing machine used in the plastics industry. In these embodiments the system can be adapted to dispense masterbatch in discrete batches for feeding into an injection molding machine or the system can be adapted to dispense masterbatch in a continuous manner for direct introduction into extruding machines.

All the above and other characteristics and advantages of the invention will be further understood through the following illustrative and non-limitative description of embodiments thereof, with reference to the appended drawings.

DETAILED DESCRIPTION OF THE INVENTION

The invention is a weighing and feeding system for accurate weighing of small quantities of material in pelletized form and feeding the weighed material to processing machines. In particular the invention is suitable for the preparation of weighed quantities of masterbatch to be added with resin directly into injection molding or extrusion machines for the manufacture of plastic products.

It should be noted that, although the invention is described herein with reference to its application to the plastic industry, this system of the invention can also be used as described in laboratories and many other industries that require very accurate measurement of small quantities of material, e.g. in the dye and pharmaceutical industries.

Figure 1:
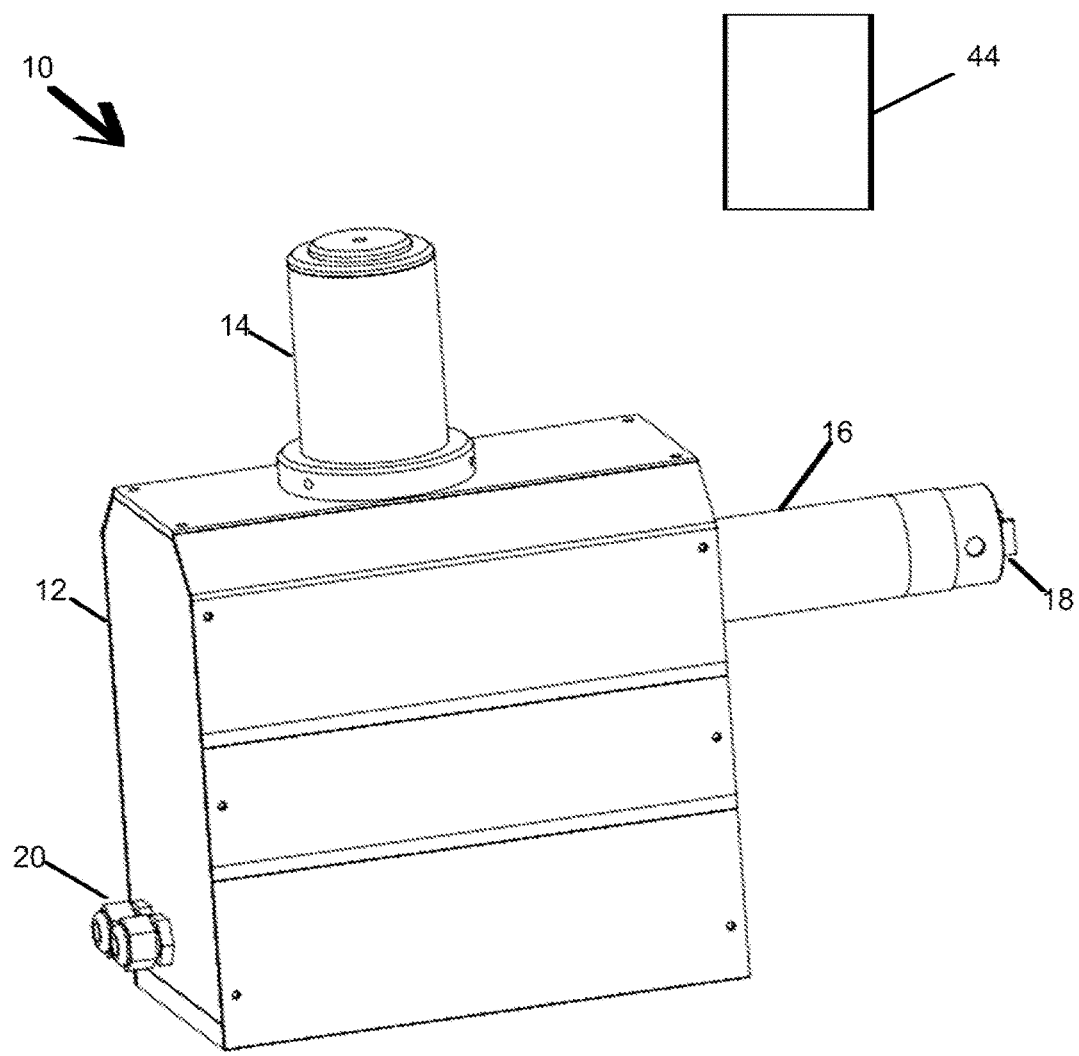
FIG. 1 is a schematic isometric view of an embodiment of the system 10 of the invention.

FIG. 1 is a schematic isometric view of an embodiment of the system 10 of the invention. System 10 is enclosed in housing 12. On the top of housing 12 is seen a protective cover 14 that surrounds a hopper. In another embodiment the hopper is replaced by a Vacuum loader. Attached fixedly to the front side of housing 12 is seen a hollow outlet shaft 16.

At the back side of housing 12 are shown ports 20 through which cables for power and communication to an external controller 44 can pass. Seen protruding from the end of outlet shaft 16 is the end of an extension of outlet channel 18. The outlet shaft 16 is fixedly attached to the external wall of housing 12.

Figure 2B:
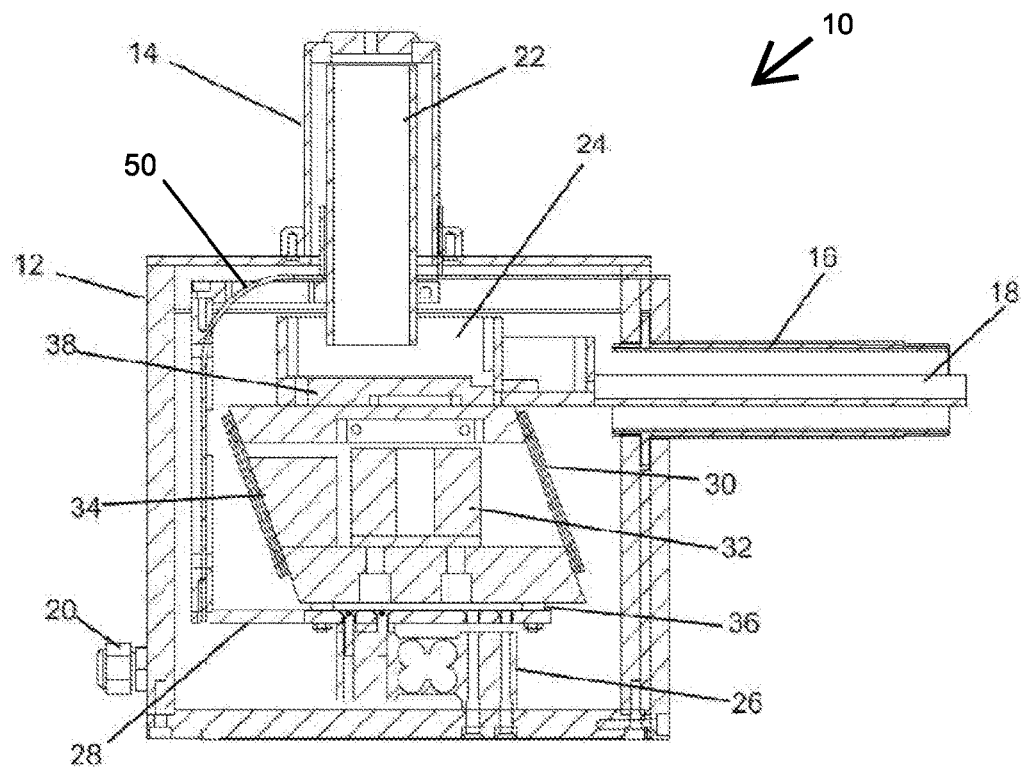
FIG. 2B is a vertical sectional view that schematically shows components of the system of FIG. 1.
Figure 2A:
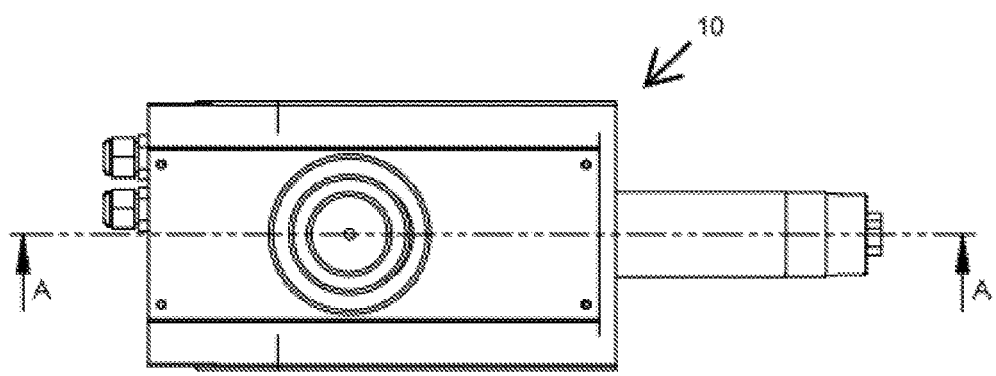
FIG. 2A is a top view of system shown in FIG. 1.

FIG. 2A is a top view of system 10. FIG. 2B is a sectional view taken along plane AA in FIG. 2A that schematically shows internal components of the system.

Referring to FIG. 2B, at the bottom of housing 12 is a load cell 26, e.g. comprised of strain gauges, that is anchored to the housing. On top of the load cell is attached a weighing platform 28. A vibration unit 30 comprised of electromagnet 32 and a heavy iron block 34 is located above the weighing platform 28. Vibration dampers 36, e.g. rubber pads, are located between the weighing platform 28 and vibration unit 30 to insulate as much as possible the load cell from vibrations caused by the vibration unit. A plate 38 is located on top of vibration unit 30. A tray 24 and the beginning section of outlet channel 18 that are constructed on the top of plate 38 will be described herein below with reference to FIG. 3B. Protruding through the top of housing 12 are a hopper 22 (in this embodiment having a cylindrical shape) surrounded by a spaced-apart co-axial protective cover 14. In contrast to protective cover 14, which is attached to housing 12, hopper 22 is not in contact with the housing but is supported over tray 24 by brackets 50 connected to the weighing platform 28 or the top of the tray.

With the arrangement shown in FIG. 2B, hopper 22 (and material placed in it), tray 24 (and material that has fallen into it from hopper 22), vibration unit 30, plate 38, and weighing platform 28 are all weighed together by load cell 26.

In the embodiments of the system that comprise a Vacuum loader instead of hopper 22, the Vacuum loader is not attached to weighing platform 28 and only tray 24 (and material that has fallen into it, from the Vacuum loader), vibration unit 30, plate 38, and weighing platform 28 are all weighed together by load cell 26.

Figure 3B:
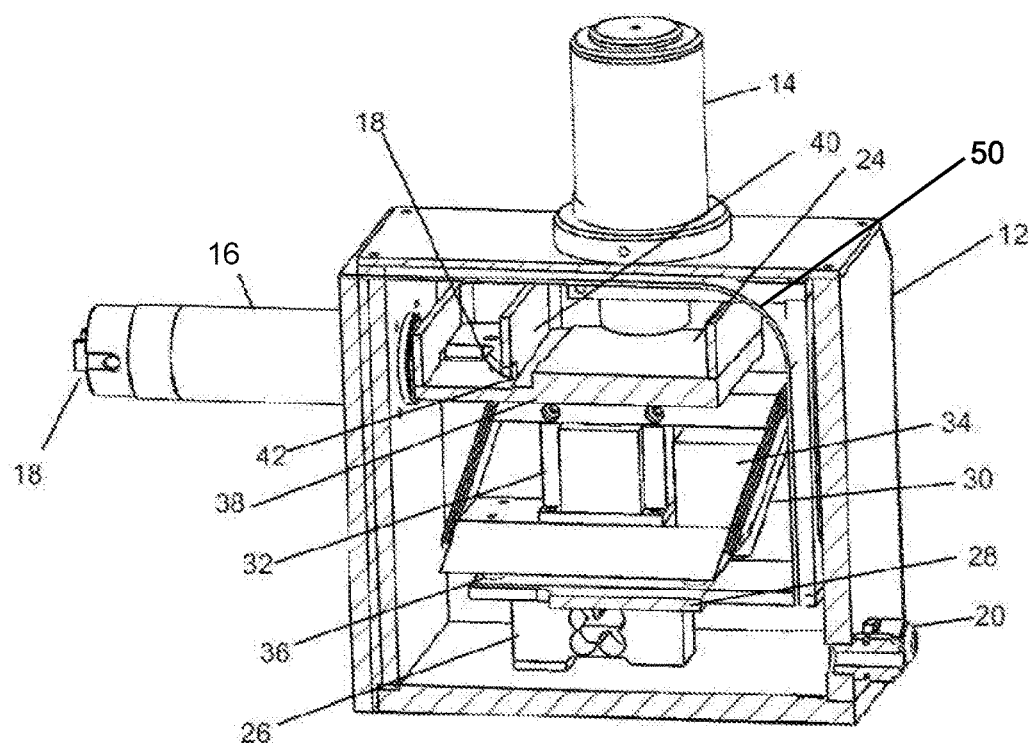
FIG. 3B is a sectional view taken along plane BB in FIG. 3A that schematically shows internal components of the system.
Figure 3A:
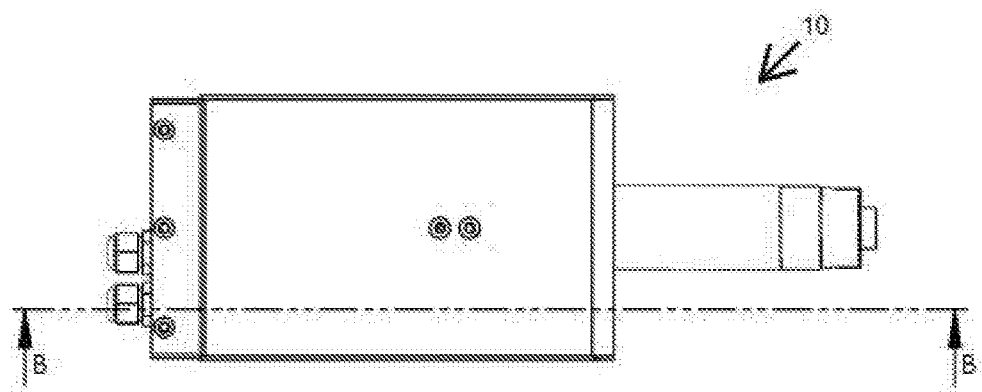
FIG. 3A is a bottom view of system 10.

FIG. 3A is a top view of system 10. FIG. 3B is a sectional view taken along plane BB in FIG. 3A that schematically shows internal components of the system.

Referring to FIG. 3B, the area on the top of plate 38 is divided into two sections. On the larger rear section is created a tray 24 into which masterbatches fall from the hopper. The beginning section of output channel 18 is created on top of the forward section of plate 38. The front wall 40 of tray 24 has a small opening 42 in its bottom opposite the start of output channel 18. The plate 38 is inclined towards the output of the system so that, when the vibration unit 30 is activated, the beads of masterbatch pass out of housing 12 and then continue in essentially single file to the processing machine through the extension of outlet channel 18 that is protected by outlet shaft 16.

The vibration unit 30 causes tray 24 to vibrate at a constant frequency, but the amplitude of the vibrations can be changed, thereby increasing or decreasing the flow rate of masterbatch through the machine. The system of the invention has the advantage over existing auger based dispensing systems that it can, on the one hand, dispense single pellets of masterbatch and, on the other hand, can dispense the number of pellets per unit time over a continuous range that would require the use of at least two or three different pitched augers in conventional systems.

System 10 uses the loss-in-weight method to determine the weight of masterbatch that have been dispensed in a given period of time. With reference to FIG. 2B, with vibration unit 30 turned off, tray 24 and material that has fallen into it from hopper 22 or from the Vacuum loader, vibration unit 30, plate 38, weighing platform 28 are all weighed together by load cell 26 to obtain an initial weight. In the embodiments that comprise a hopper 22, also hopper 22 and material placed in it are weighed by load cell 26 to obtain the initial weight. Vibration unit 30 is then activated to cause the pellets to pass through output channel 18 for a given period of time after which it is again turned off and a final weight is measured. The weight of material that has been dispensed by the system is then simply determined as the difference between the initial and final weights.

System 10 can be used to dispense masterbatch in discrete batches, for example for feeding into injection molding devices, or to dispense masterbatch in a continuous manner for direct introduction into extruders. In both cases, the masterbatches are combined with resin, which is weighed and fed by a separate apparatus that is not a part of the present invention and not described herein, before the combined raw material enters the processing machine.

System 10 is connected to a controller 44 comprising a processor. The controller is adapted to control the feed rate (weight/time) of material from the system of the invention to a process machine. The controller is also responsible for synchronizing the rate and timing of feeding of material from system 10 with the operation of the process machine and other systems that supply different materials, e.g. the resin, to the process machine. The controller provides a desired feed rate by controlling the values of the amplitude and duration of the vibrations provided by vibration unit 30 and by receiving signals from load cell 26 and using the loss-in-weight method to calculate the weight of the batches of masterbatch. The weighing function is used both in an initial calibration stage and also to provide feedback to change the amplitude of the vibrations if necessary during production runs as will be described herein below. Desired values of the feed rate and duration of the time period that the material must be supplied to system 10, e.g. the weight of masterbatch and when and for how long the vibration unit 30 must be activated, are determined from the characteristics of the process machine, the characteristics of the product being produced, and other factors such as the color. The desired values can either be entered manually or supplied automatically by other controllers such as a controller that controls operation of the process machine.

In injection molding a known period of time is required to fill the mold with the raw material and then there is an interval until the product has been produced and the mold emptied when no new material is supplied. To produce a given item by this method, the quantity of a particular type of masterbatch must be supplied to the mold to provide a specific property, e.g. color, to the final product is known and entered into the controller. At the beginning of a production run, the duration of the time period in which each portion of material must be supplied and the approximate amplitude of the vibrations, e.g. voltage to the coils of the electromagnet in the vibration unit, are entered into the controller. A quantity of the selected masterbatch is put into the hopper and the vibration unit is activated to fill the entire outlet channel with pellets of masterbatch. The vibration unit is then shut off and an initial weight measurement made. The vibration unit is then activated for the required time period and then shut off and a final weight measurement is made. The controller determines the loss-in-weight, i.e. the weight of masterbatch fed, and compares it to the required weight. If the measured weight is too high, then the value of the amplitude is reduced and if it is too low the amplitude is increased. This process is repeated as many times as necessary until the amplitude is found that feeds the required weight of masterbatch in the required time period. The production run can now begin. During the production run the weight of each batch of masterbatch is weighed and the controller periodically provides feedback to the vibration unit in order to change the amplitude of the vibrations if necessary to correct any systematic deviation of the weight of the batches from the desired weight.

A similar procedure is used in an extrusion process. After an initial calibration the production run starts. In this case the masterbatch must be continuously fed to the extruder so the weight measurements that are used to provide feedback to system 10 are made with the vibration unit 30 operating. The accuracy of the measurements is essentially not influenced by the vibrations because of the vibration dampers 36. Also the amplitude of the vibrations is relatively low and, because the vibration unit operates at a constant frequency, electronic filters are used to separate noise due to vibration from the signals from the load cell.

A second method of changing the rate with which the masterbatch is supplied by the system of the invention is to set the controller to activate the vibration unit to feed the masterbatch for a period of time that is less than, e.g. 80%, of the duration of the actual time period in which material must be supplied to the mold. Calibration and feedback are carried out as described above only in this method, if the measured weight of the batches is not the same as the required weight, then the controller changes the time in order to provide correct amount of masterbatch. If the controller determines that the time that the vibration unit should be activated in order to supply the required weight of masterbatch exceeds the duration of the actual time period, then the controller changes the amplitude of the vibrations in order to be able to reset the time period to the shortened time period originally selected.

Although embodiments of the invention have been described by way of illustration, it will be understood that the invention may be carried out with many variations, modifications, and adaptations, without exceeding the scope of the claims.

The invention claimed is:

1. A weighing and feeding system for accurate weighing of material in pelletized form and feeding the weighed material to processing machines, the system comprising:
   a) a housing;
   b) a hopper adapted to contain the material in pelletized form;
   c) a plate, the top of which is divided into two sections;
   d) a vibration unit located under the plate;
   e) a load cell
   f) a weighing platform attached to the top of the load cell and located under the vibration unit;
   g) brackets connected to the weighing platform configured to support the hopper over the tray; and
   h) a controller configured to control the feed rate (weight/time) of material from the system to the process machine;
   characterized in that:
   i) the housing encloses the hopper, the plate, the vibration unit, the weighing platform, the brackets, and the load cell;
   ii) the top of the plate comprises: a tray configured to receive pellets of the material that fall out of the hopper created on a larger rear section of the plate and a beginning section of an outlet channel created on a smaller forward section of the plate and an extension of the outlet channel leading from the beginning section of the outlet channel to a process machine;

iii) the vibration unit is configured to cause pellets of the material to move out of the tray through a small opening at the bottom of a front wall of the tray into the beginning section of the outlet channel and from there in essentially single file through the extension of the outlet channel to the processing machine;

iv) the load cell is configured to weigh: the plate, the tray and its contents, the outlet channel and its contents, the vibration unit, the brackets, the weighing platform, and the hopper and its contents; and v) the controller is configured to control the feed rate (weight/time) of material from the system of the invention to a process machine by causing the vibration unit to vibrate at a constant frequency while controlling the values of the amplitude and duration of the vibrations provided by the vibration unit in order to synchronize the rate and timing of feeding of material with the operation of the process machine.

2. The system of claim 1 wherein the controller controls the feed rate (weight/time) of material from the system by controlling the values of the amplitude and duration of the vibrations provided by the vibration unit and by receiving signals from the load cell and using the loss-in-weight method to calculate the weight of material that has passed through the system in a known period of time.

3. The system of claim 1 wherein the controller is adapted to synchronize the rate and timing of feeding of material from the system with the operation of the process machine and other systems that supply different materials to the process machine.

4. The system of claim 1 wherein the housing comprises at least one of:
a) a protective cover surrounding and spaced apart from the hopper, the protective cover fixedly attached to the outside of the top of the housing;
b) a hollow outlet shaft surrounding the extension of the outlet channel, the hollow outlet shaft fixedly attached to the outside of the front side of the housing.

5. The system of claim 1 wherein the vibration unit is comprised of an electromagnet and an iron block.

6. The system of claim 1 wherein the front wall of the tray comprises at least one opening at its bottom through which pellets of material that have fallen into the tray from the hopper can pass out of the tray and into the beginning section of the outlet channel.

7. The system of claim 1 wherein the controller is adapted to make measurements of the feed rate during production runs, to compare the measured teed rates with the required value and to use these measurements as feedback to correct the rate if necessary.

8. The system of claim 7 wherein the correction is applied by changing the amplitude of the vibrations.

9. The system of claim 7 wherein the system is calibrated to feed a required quantity in a period of time that is less than a required period of time and the correction is applied by changing the period of time in which the required quantity is fed.

10. The system of claim 1 wherein the material in pelletized form is masterbatch and the processing machine is a processing machine used in the plastics industry.

11. The system of claim 10 wherein the system is adapted to dispense masterbatch in discrete batches for feeding into an injection molding machine.

12. The system of claim 10 wherein the system is adapted to dispense masterbatch in a continuous manner for direct introduction into extruding machines.

13. The system of claim 1 comprising vibration dampers located between the vibration unit and the weighing platform.

14. A method of accurate weighing of small quantities of material in pelletized form and feeding the weighed material to processing machines, the method comprising:
a) providing a weighing and feeding system according to claim 1;
b) filling the hopper with pellets of the material;
c) allowing pellets of the material to fall from the hopper into the tray;
d) calibrating the system, wherein the calibration comprises:
i) activating the vibration unit to to cause pellets to pass out of the tray into the output channel until the entire outputchannel is filled with pellets;
ii) turning off the vibration unit;
iii) weighing with the load cell the hopper and material placed in it, the tray and material that has fallen into it from the hopper, the vibration unit, the plate, and the weighing platform together to obtain an initial weight;
iv) activating the vibration unit to cause pellets to pass out of the tray and through output channel for a given period of time;
v) turning the vibration unit off;
vi) weighing with the load cell the hopper and material placed in it, the tray and material that has fallen into it from the hopper, the vibration unit, the plate, and the weighing platform together to obtain a final weight; and
vii) determining the weight of material dispensed by the system in the given period of time by taking the difference between the initial and final weights;
e) activating the vibration unit to cause pellets to pass out of the tray and through output channel to a process machine; and
f) activating the controller to control the feed rate (weight/time) of material from the system;
characterized in that the controller controls the feed rate (weight/time) of material from the system of the invention to the process machine by causing the vibration unit to vibrate at a constant frequency while controlling the values of the amplitude and duration of the vibrations provided by vibration unit in order to synchronize the rate and timing of feeding of material with the operation of the process machine and other systems that supply different materials to the process machine.

* * * * *